United States Patent Office 2,868,826
Patented Jan. 13, 1959

2,868,826

CYCLOHEXENYLETHYLDIETHOXYSILANE

Donald L. Bailey, Snyder, and William T. Black, Buffalo, N. Y., assignors to Union Carbide Corporation, a corporation of New York No Drawing. Application October 31, 1955
Serial No. 544,037

1 Claim. (Cl. 260—448.8)

This invention relates to a novel polymerizable silane derivative. More particularly, the invention contemplates the provision of a polymerizable silane derivative of mixed aliphatic-aromatic composition, wherein the substituent groups consist of ethyl, ethoxy and the unsaturated cyclic radical, cyclohexenyl, in the form cyclohexenylethyldiethoxy silane, as represented by the structural formula:

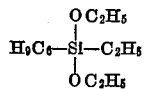

In general, the alkylalkoxysilane derivatives function in much the same manner as the alkylchlorosilanes in that they hydrolyze to form corresponding silicols or their dehydration products. Apart from hydrolysis, the silicic esters may be reacted through their alkoxy groups with the Grignard reagent to attach organic groups directly to the silicon nucleus, and, generally exhibit a great many of the reactive characteristics of the silicic halides. Silane derivatives containing the unsaturated olefinic bond in at least one substituent group also form a distinct and highly useful class of compounds by reason of the fact that they may be crosslinked readily through their reactive organic substituent or substituents in the formation of high molecular weight polymers, or copolymers by reaction with other olefinic materials. Furthermore, the reactivity of a silicon-bonded unsaturated group permits the application of specialized curing techniques, other than conventional condensation procedures to polymeric molecules containing unsaturated substituents of this type, such, for example, as in the preparation of silicone rubbers. We have found that the cyclo-olefine substituent group of the compound of the present invention, cyclohexenyl, not only demonstrates substantially all of the usual olefine reactions but is also slightly more reactive than the conventional open-chain type of unsaturated groups found in similar silane derivatives presently known in industry, presumably because the ring structure facilitates opening of the double bond.

For the most part, the alkyl silicones of relatively high R/Si ratios form oily liquids or weak gels when polymerized, whereas in contrast thereto the aryl silicones of equivalently high R/Si ratios are brittle, fusible solids of little use for most commercial applications. It is now well established that it is possible to enhance the properties of either type of resin by modification with the other, as, for example, by attaching mixed alkyl and aryl substituents to a common silicon atom within the polymeric molecule either by copolymerization of alkyl and aryl silicols, or by modification or substitution within the intermediate compound or compounds employed in the production of such resins. We have found that the cyclohexenyl-modified alkyldialkoxy silane derivative of the present invention provides an excellent source of mixed alkyl-aryl properties, and, as such, is a useful intermediate in the production of siloxanes in general, and copolymers formed by copolymerization of the compound with organic monomers. Specifically, the compound of the invention is ideally suited for use in the production of silicone elastomers.

The compound cyclohexenylethyldiethoxy silane may be obtained by reaction of cyclohexenylethyldichlorosilane with ethanol followed by distillation for recovery of the pure product.

The invention may be best understood by reference to the following specific example of a typical preparation and recovery of our novel compound in accordance with the foregoing procedure:

EXAMPLE

*Preparation of cyclohexenylethyldiethoxy silane*

$\Delta^3$-cyclohexenylethyldichlorosilane, prepared by reacting butadiene with vinylethyldichlorosilane, in amount 180 grams, was placed in a one liter, three-necked flask fitted with a stirrer, dropping funnel and reflux condenser. The flask was sparged continuously with nitrogen. Thereafter, 40 grams of ethanol was slowly added over a two (2) hour period. The temperature was then raised to 60° C. and 40 grams more of ethanol were added over an additional two (2) hour interval. The nitrogen sparge was continued until hydrogen chloride could no longer be detected in the off-gas. The residual hydrogen chloride was neutralized with sodium ethoxide until the solution was slightly alkaline, and, thereafter, the solution was distilled.

Cyclohexenylethyldiethoxy silane was obtained in a yield of sixty-three percent (63%) and showed the following physical properties, among others:

Boiling point _____ 78–80° C./1 mm. Hg.
Density ($d_4^{25}$) _____ 0.936 gr./cc.
Refractive index ($n_D$ at 25° C.)_ 1.4488.

The compound of the invention was successfully equilibrated into a polymer with octamethylcyclotetrasiloxane tetramer $[(CH_3)_2SiO]_4$.

Since it is considered obvious that many changes and modifications can be made in the foregoing methods and procedures without departing from the nature and spirit of our invention, it is to be understood that the invention is not to be limited to the specific details offered by way of illustration above, except as set forth in the following claim.

The chemical compound cyclohexen-3-yl-1-ethyl diethoxysilane.

References Cited in the file of this patent

UNITED STATES PATENTS

| | | |
|---|---|---|
| 2,532,583 | Tyran | Dec. 5, 1950 |
| 2,595,727 | Swiss et al. | May 6, 1952 |
| 2,596,967 | Frost | May 20, 1952 |
| 2,600,307 | Lucas et al. | June 10, 1952 |
| 2,665,264 | Brooks et al. | Jan. 5, 1954 |
| 2,805,235 | Kiffer et al. | Sept. 3, 1957 |
| 2,805,237 | Kiffer et al. | Sept. 3, 1957 |

OTHER REFERENCES

Wagner et al.: "Ind. and Eng. Chem.," vol. 45 (1953), pp. 368, 370.